A. C. DODGE.
WEIGHING MACHINE.
APPLICATION FILED APR. 4, 1911.

1,180,380.

Patented Apr. 25, 1916.
5 SHEETS—SHEET 2.

WITNESSES:

INVENTOR
Alfred C. Dodge
BY
J. H. Freeman
ATTORNEY

A. C. DODGE.
WEIGHING MACHINE.
APPLICATION FILED APR. 4, 1911.

1,180,380.

Patented Apr. 25, 1916.
5 SHEETS—SHEET 3.

Witnesses:
H. M. Ingham
R. R. Murphy

Inventor
Alfred C. Dodge
By his Attorney J. H. Freeman

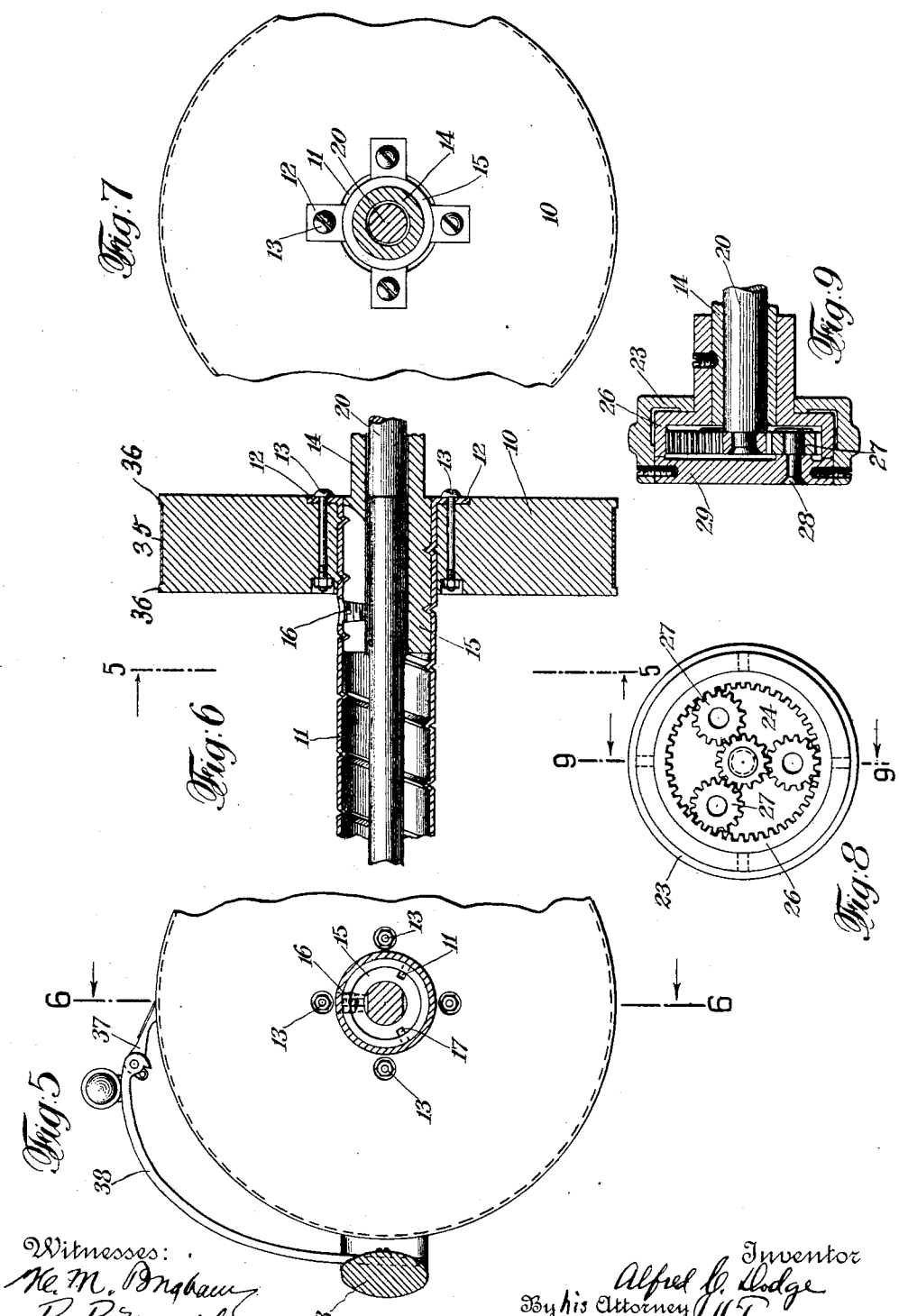

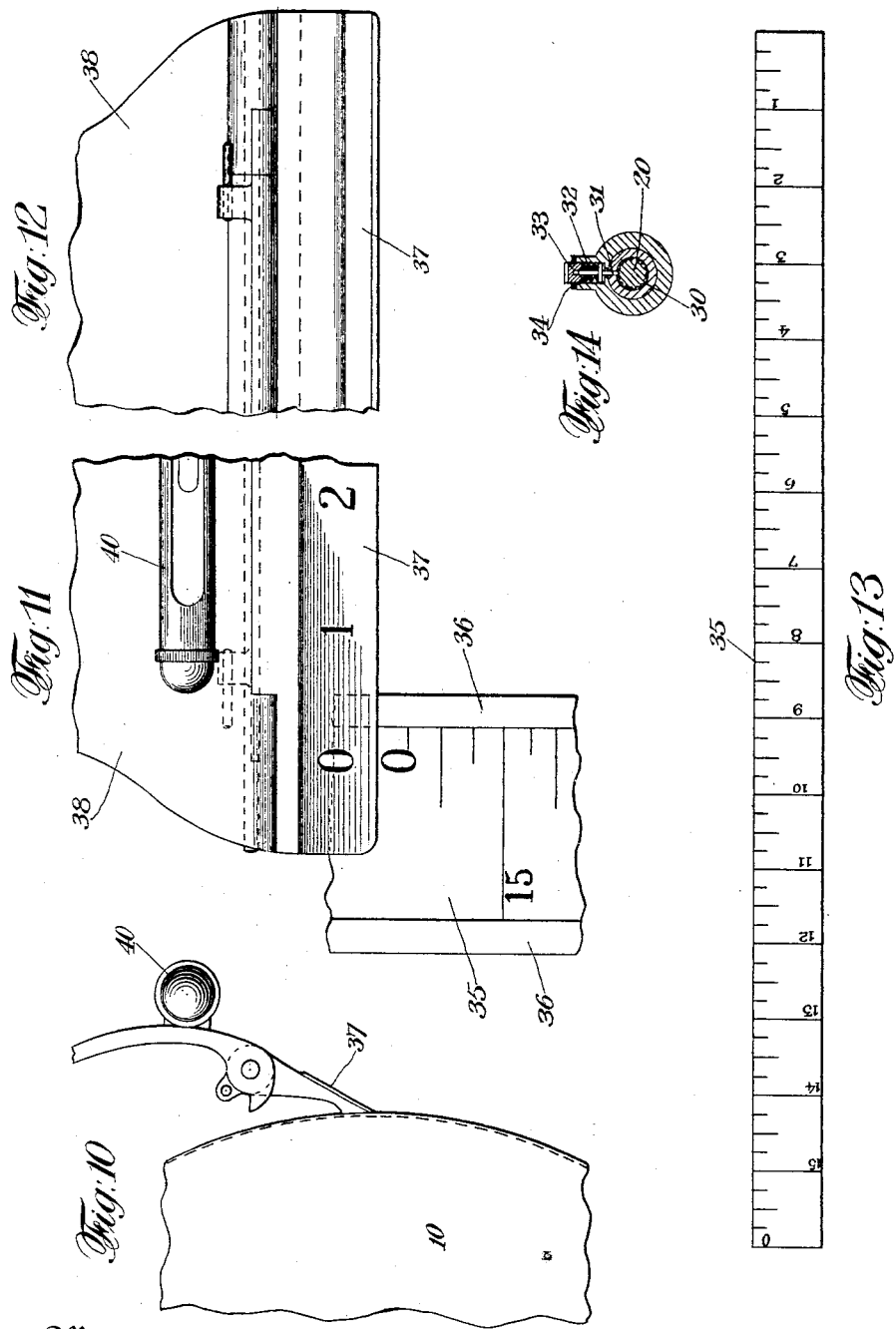

UNITED STATES PATENT OFFICE.

ALFRED C. DODGE, OF YONKERS, NEW YORK.

WEIGHING-MACHINE.

1,180,380.  Specification of Letters Patent.  Patented Apr. 25, 1916.

Application filed April 4, 1911. Serial No. 618,962.

*To all whom it may concern:*

Be it known that I, ALFRED C. DODGE, a citizen of the United States, and a resident of Yonkers, Westchester county, State of New York, have invented certain new and useful Improvements in Weighing-Machines, of which the following is a specification.

This invention relates to weighing machines, and is especially applicable to beam scales, such as are employed by grocers, druggists, and the like.

Objects of the invention are to provide a machine for accurately, rapidly, and readily ascertaining the weights; and to provide a machine having a rotary, longitudinally movable poise carrying fractional graduations and coöperating with a fixed scale carrying the unit graduations, with improved means for facilitating the reading of the weights and for causing and controlling the movements of the poise, whereby the machine is rendered simple and cheap in construction and yet rapid, reliable and accurate in operation.

These and other objects of the invention will in part be obvious and in part be more fully explained in the following description.

The invention consists in the novel parts, improvements, combinations, and features of construction herein shown and described.

The accompanying drawings, referred to herein and made a part hereof, illustrate one embodiment of the invention and serve in connection with the description herein to explain the principles of the invention.

Figure 1:
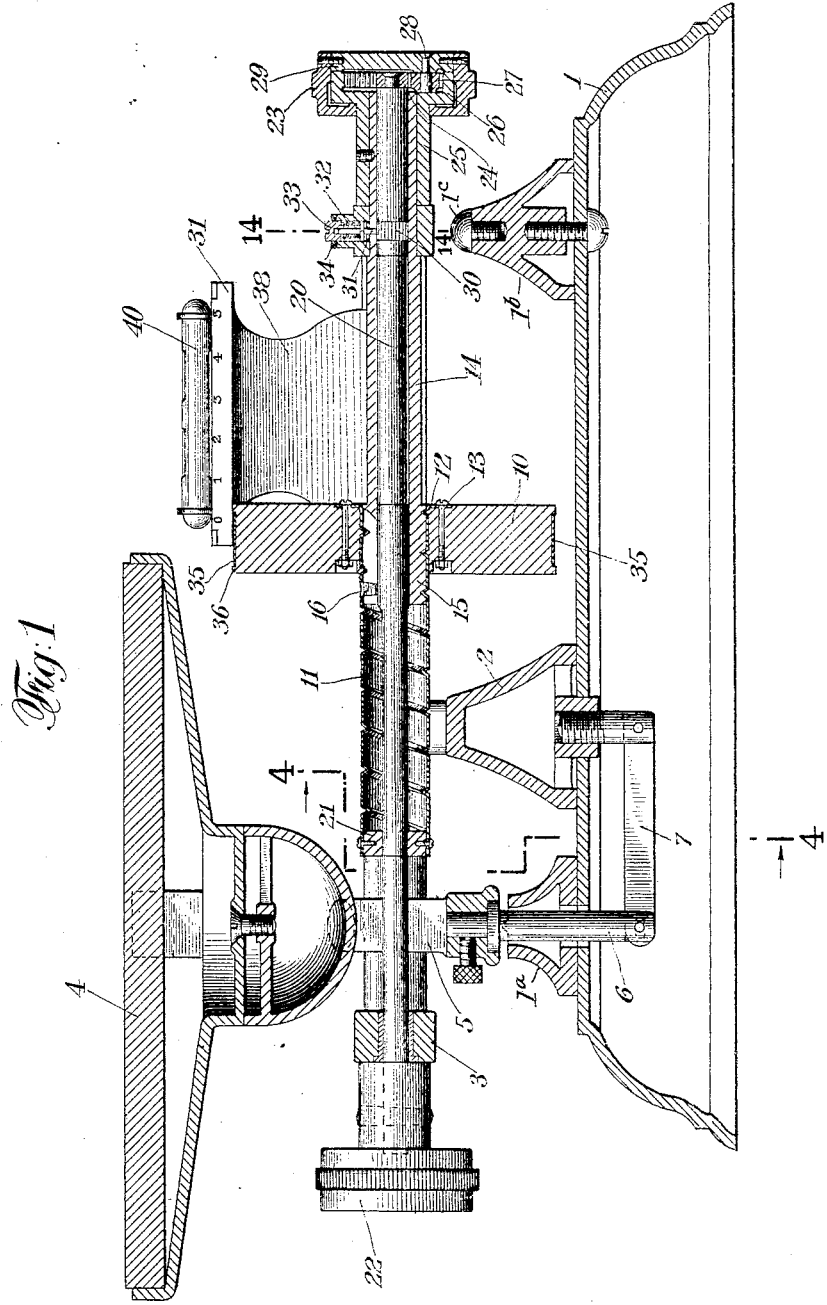
Figure 2:
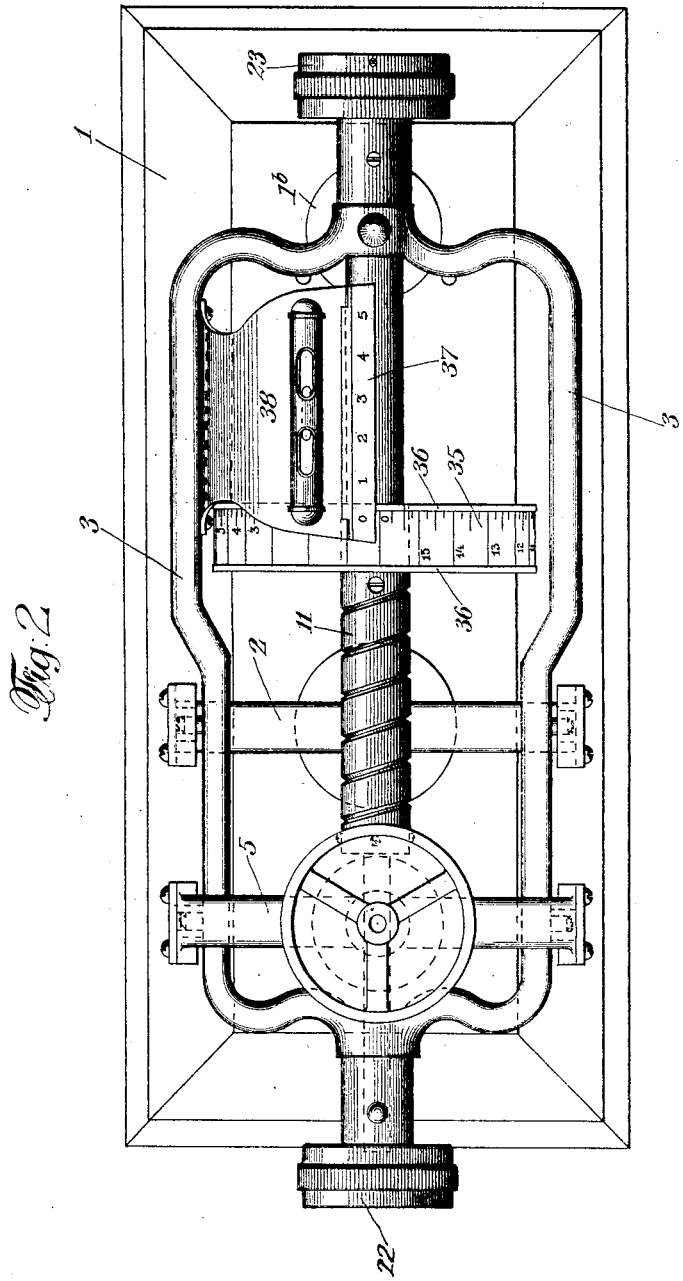
Figure 3:
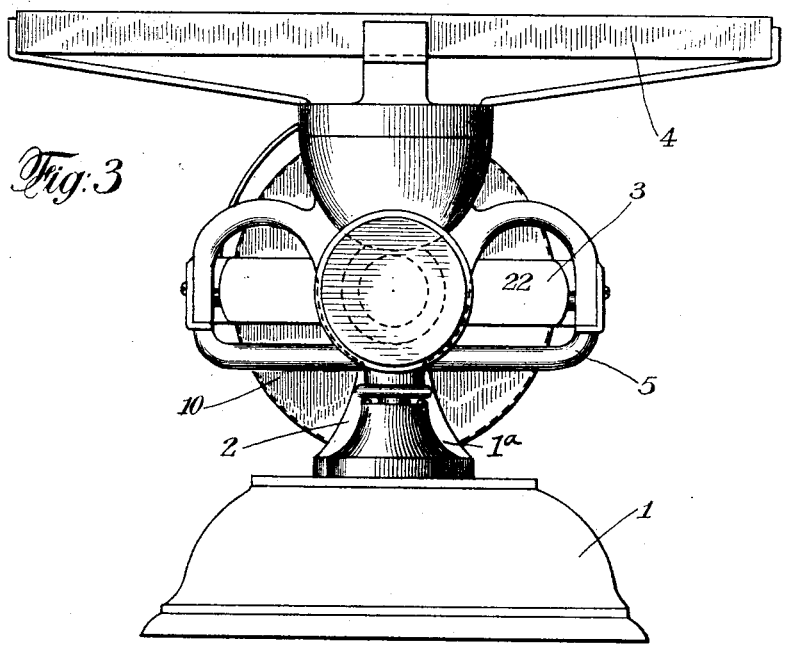
Figure 4:
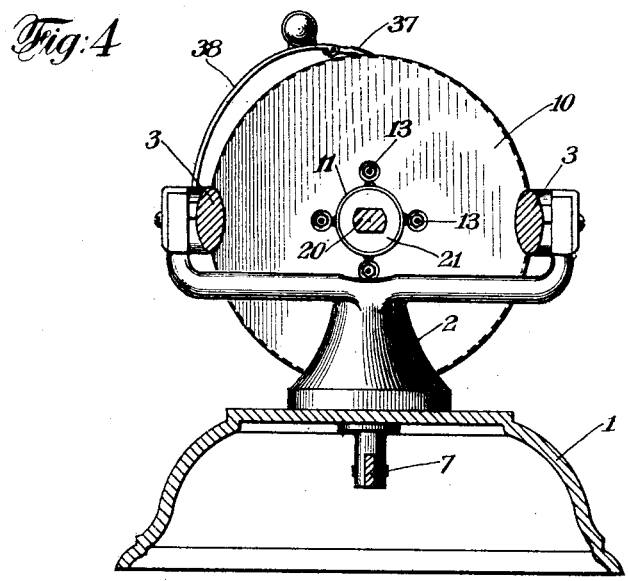

Of the drawings: Figure 1 is a vertical longitudinal sectional view illustrating a beam scale embodying the various features of the invention; Fig. 2 is a plan view of the same; Fig. 3 is an end elevation, as seen from the left in Fig. 1; Fig. 4 is a vertical section taken on the line 4—4 of Fig. 1; Fig. 5 is a vertical section, partly in elevation, illustrating certain details, the section being taken on the line 5—5 of Fig. 6; Fig. 6 is a vertical longitudinal sectional view taken on the line 6—6 of Fig. 5; Fig. 7 is a side elevation, partly in section, of the parts shown in Fig. 6, as seen from the right; Fig. 8 is an elevation illustrating a detail; Fig. 9 is a sectional view taken on the line 9—9 of Fig. 8; Fig. 10 is a fragmentary elevation illustrating certain details on an enlarged scale; Fig. 11 is a plan view of the same; Fig. 12 is an inverted plan of the same; Fig. 13 is a plan, illustrating still another detail; and Fig. 14 is a vertical sectional view taken on the line 14 of Fig. 1 and illustrating a detail.

In the embodiment of the invention illustrated the scale comprises a base 1 having a standard 2 upon which the beam frame 3 is pivotally mounted by suitable anti-friction bearings. Pivotally connected with the beam at one side of the standard 2 is a support 4 for the material to be weighed. Any suitable form of support may of course be employed, that illustrated being such as might be used for weighing meat. The frame 5 of the support 4 has a depending arm 6 which projects through an opening in the base 1 and is connected at its lower end with a guide link 7. Abutments $1^a$ and $1^b$ are fixed on the base 1 near the opposite ends of the beam frame 3. The abutment $1^a$ is perforated to receive the arm 6 and the abutment $1^b$ is provided with a removable buffer tip $1^c$ which is adapted to contact directly with the corresponding end of the beam frame 3.

Mounted upon the beam is a rotary and longitudinally movable poise 10. In accordance with one feature of the invention means are provided for moving the poise with relation to the beam without extending the beam or causing any part carried thereby to protrude beyond the ends of the scale. To this end, the poise 10 is fixed upon a threaded member 11 which is capable of motion longitudinally of the beam, and means are provided for rotating this threaded member without partaking of its longitudinal movement. As shown, the threaded member 11 is in the form of an elongated nut and is constructed of thin material having a thread rolled in its surface. As shown, the member 11 is fastened to the poise 10 by flanges 12 which are engaged by bolts 13 passing through the poise 10. The member 11 is mounted upon a sleeve 14 which is fixed near one end in the beam 3 and has at its other end an enlarged head 15 which is exteriorly threaded to coöperate with the inner threads of the member 11. In order to compensate for any lost motion between the threaded members, means are provided for slightly expanding the head 15. As shown the head 15 is split along one side and is provided with a threaded aperture in which is located a tapering screw 16. It will be seen that by driving the screw farther into the aperture the head will be expanded. To facilitate the expansion of the head it may be provided with additional longitudinal grooves 17, as indicated in Fig. 5.

For the purpose of rotating the poise with its member 11 a shaft 20 is provided, the same being, preferably, journaled at one end within the sleeve 14 and at the other end in the beam frame 3. In order that the motion of the shaft may be transmitted to the poise, the threaded member 11 is provided at the end opposite to that to which the poise is attached with a collar 21 which, while free to move longitudinally of the shaft, is confined to rotate therewith. As shown, the shaft has a flattened portion and the bore of the collar is made to conform to the cross-sectional shape of the shaft, as clearly shown in Fig. 4. The shaft 20 is preferably provided at each end with means for turning it. As shown, it is provided at the left-hand end, or that end which is located beneath the support for the material to be weighed, with a suitable knob or handle 22, this knob being directly connected with the shaft so that the speed of rotation of the shaft will be the same as that of the knob. A similar knob 23 is provided at the opposite end of the shaft but, preferably and as shown, means are provided for multiplying the motion of this knob, as transmitted to the shaft, so that, while the shaft rotates in the same direction as the knob, its speed of rotation will be greater. To this end, the shaft is provided with a gear 24 and the knob 23 is mounted upon a sleeve 25 which is provided with an enlarged head 26 having an internal gear concentric with the gear 24. Arranged between the gears 24 and 26 is a pinion 27. This pinion is journaled on a stud 28 fixed to the front plate 29 of the knob 23. More than one of the pinions 27 may be provided, if desired. As shown in Fig. 8 there are three of these pinions, it being understood that each of them is mounted upon a suitable stud connected with the knob 23. It will be seen that the rotary movement of the knob 23 will cause the pinions 27 to be rotated upon their studs by the internal gear 26 and that they will in turn rotate the gear 24 on the shaft 20, the direction of the shaft's rotation being the same as that of the orbital movement of the pinion 27 and of the handle by which this orbital movement is effected.

For the purpose of controlling the movements of the poise, a yielding detent is preferably provided, the same tending to hold the poise at predetermined points in its revolution, preferably, the points corresponding to the graduations on the poise. As shown, the shaft 20 is provided with a series of slight depressions 30, and a pin 31 is mounted in the beam frame 3 with its end normally pressed into engagement with the depressions by a spring 32, the tension of which may be adjusted by a screw 33. The screw 33 may be held against accidental displacement by a jam nut 34.

The poise 10 is provided with graduations upon its periphery, these graduations preferably representing the fractions of a pound. Preferably the graduations are formed by printing them on a strip 35 of flexible material, such as celluloid, and securing this strip in a recess in the periphery of the cylinder so that the strip will be protected by circumferential flanges 36 formed at the opposite sides of the poise. Arranged to coöperate with the graduations of the poise is a scale 37 mounted on the beam and arranged parallel to the path of movement of the poise longitudinally of the beam. As shown, the scale 37 is pivotally mounted on a standard 38 projecting upwardly from the beam 3, as shown in Figs. 4 and 5, so that the scale may rest lightly upon the flanges 36 of the poise.

In accordance with one feature of the invention, the fractional graduations or the numbers representing them are spirally arranged upon the poise, as indicated in Figs. 2, 11, and 13, so that these numbers will appear directly beneath the unit graduations or the numbers representing them upon the scale 37. That is to say, the whole series of numbers upon the poise will be successively presented to view directly beneath one of the numbers on the scale 37 during each revolution of the poise. By reason of this feature the reading of the weights is greatly facilitated, the numbers representing the fractional parts of the readings being always located directly beneath the numbers representing the unit parts of the readings. A spirit level 40 may be mounted upon the beam to render more accurate the readings thereof. As shown, this level is mounted upon the support 38 for the scale 37.

The invention in its broader aspects is not limited to the precise construction shown and described nor to any particular construction by which the same may be or has been carried out, as many changes may be made in the details thereof without departing from the main principles of the invention or sacrificing its chief advantages.

What I claim is:

1. A weighing machine including in combination, a support for the material to be weighed, a beam, a rotary and longitudinally movable poise mounted on the beam and having fractional graduations on its periphery, a scale fixed on the beam and having unit graduations arranged to coöp- erate with the fractional graduations on the poise, and means longitudinally fixed on the beam for rotating the poise.

2. A weighing machine including in combination, a support for the material to be weighed, a beam, a rotary and longitudinally movable threaded member mounted on the beam, a coöperating threaded member fixed on the beam, a poise fixed on said first mentioned member, and means longitudinally fixed on the beam for rotating said first mentioned threaded member and poise.

3. A weighing machine including in combination, a support for the material to be weighed, a beam, a rotary and longitudinally movable threaded member mounted on the beam, a coöperating threaded member fixed on the beam, a poise fixed on said first mentioned threaded member, and a shaft journaled on the beam and fixed against longitudinal movement thereon, said shaft being mounted to rotate said first mentioned threaded member while permitting relative longitudinal movement thereof.

4. A weighing machine including in combination, a support for the material to be weighed, a beam, a rotary and longitudinally movable screw threaded member mounted on the beam, a coöperating threaded member fixed on the beam, one of said members being adjusted to take up any lost motion between them, a poise fixed on said first mentioned threaded member and having fractional graduations on its periphery, a scale fixed on the beam and having unit graduations arranged to coöperate with the graduations on the poise, and means longitudinally fixed on the beam for rotating said first mentioned threaded member and poise.

5. A weighing machine including in combination, a support for the material to be weighed, a beam, a rotary and longitudinally movable poise mounted on the beam and having fractional graduations on its periphery, a scale fixed on the beam and having unit graduations arranged to coöperate with the graduations of the poise, means longitudinally fixed on the beam for rotating the poise, and a yielding detent tending to hold the poise at points in its revolution corresponding to the graduations thereof.

6. A weighing machine including in combination, a support for the material to be weighed, a beam, a rotary and longitudinally movable poise mounted on the beam, a scale having unit graduations mounted on the beam in parallel relation to the path of the poise and adjacent to its periphery, said poise having fractional graduations spirally arranged on its periphery so that each graduation will appear directly under one of the unit graduations on the scale during each revolution of the poise.

7. A weighing machine including in combination, a support for the material to be weighed, a beam, a rotary and longitudinally movable poise mounted on the beam and having a circumferential recess adapted to receive suitable graduations and forming circumferentially continuous flanges at the opposite sides of the poise, a scale pivotally mounted on the beam in parallel relation with the path of the poise and arranged to bear constantly upon the peripheral flanges thereof.

8. A weighing machine including in combination, a beam, a poise, means mounted on the beam independently of the poise for moving the poise relatively to the beam, said beam including a manually operated member, a poise driving member, and a motion modifying device between the manually operated member and the poise driving member, said device being arranged to drive the poise driving member in the same direction that the manually operated member is moved.

9. A weighing machine including in combination, a beam, a poise, means mounted on the beam for moving the poise relative to the beam, said means including a manually operated member, a poise driving gear, an internal gear fixed on the beam in concentric relation with said poise driving gear, and a pinion arranged to mesh with both said gears, said pinion being mounted upon said manually operated member.

10. A weighing machine including in combination, a support for the material to be weighed, a beam fulcrumed intermediate of its ends and carrying said material-support at one side of the fulcrum, a single means for counterpoising the beam and material-support disposed at the opposite side of said fulcrum and comprising a graduated poise-member movably mounted on the beam, means for effecting longitudinal movement of the poise in relation to the fulcrum and material-support, and means longitudinally fixed on the beam and including a turning-member and gear-mechanism connected to the poise-member and turning-member for rotating the poise-member to effect an accelerated change of its position in relation to the fulcrum of the beam.

11. A weighing machine including in combination, a support for the material to be weighed, a beam fulcrumed intermediate of its ends and carrying said material-support at one side of the fulcrum, a single means for counterpoising the beam and material-support disposed at the opposite side of said fulcrum and comprising a poise-member movably mounted on the beam and having fractional-graduations on its periphery, a scale fixed on the beam to overhang the periphery of the poise-member and having unit-graduations arranged to coöperate with the fractional-graduations on the poise-member; means for effecting longitudinal movement of the poise in relation to the fulcrum and material-support, and means longitudinally fixed on the beam and including a turning-member and gear-mechanism connected to the poise-member and turning-member for rotating the poise-member to effect an accelerated change of its position in relation to the fulcrum of the beam.

In testimony whereof, I have signed my name to this specification, in the presence of two subscribing witnesses.

ALFRED C. DODGE.

Witnesses:
WM. J. DOLAN,
R. R. MURPHY.

Copies of this patent may be obtained for five cents each, by addressing the "Commissioner of Patents, Washington, D. C."